US012459267B2

(12) United States Patent
Karita

(10) Patent No.: US 12,459,267 B2
(45) Date of Patent: Nov. 4, 2025

(54) LIQUID SUPPLY DEVICE

(71) Applicant: CANON KABUSHIKI KAISHA, Tokyo (JP)

(72) Inventor: Seiichiro Karita, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 186 days.

(21) Appl. No.: 18/365,593

(22) Filed: Aug. 4, 2023

(65) Prior Publication Data

US 2024/0051303 A1 Feb. 15, 2024

(30) Foreign Application Priority Data

Aug. 10, 2022 (JP) ................................ 2022-128228

(51) Int. Cl.
*B41J 2/175* (2006.01)

(52) U.S. Cl.
CPC ....... *B41J 2/17513* (2013.01); *B41J 2/17596* (2013.01)

(58) Field of Classification Search
CPC .... B41J 2/17513; B41J 2/17596; B41J 2/175; B41J 2/17509; B41J 2/1752; B41J 2/17523; B41J 2/17553; B41J 2/17556; B41J 29/13
USPC ........................................................... 347/86
See application file for complete search history.

(56) References Cited

U.S. PATENT DOCUMENTS

| | | | | |
|---|---|---|---|---|
| 9,914,308 B2 | 3/2018 | Yamada et al. | .......... | B41J 2/175 |
| 9,975,340 B2 | 5/2018 | Karita et al. | ............ | B41J 2/155 |
| 9,981,464 B2 | 5/2018 | Karita et al. | ............ | B41J 2/045 |
| 10,005,287 B2 | 6/2018 | Yamada et al. | .......... | B41J 2/175 |
| 10,195,868 B2 | 2/2019 | Yamada et al. | .......... | B41J 2/175 |
| 10,471,711 B2 | 11/2019 | Karita et al. | ............ | B41J 2/175 |
| 11,472,190 B2 | 10/2022 | Karita | ...................... | B41J 2/175 |
| 2017/0341408 A1* | 11/2017 | Akahane | .............. | B41J 2/17596 |
| 2018/0178535 A1* | 6/2018 | Tomoguchi | .......... | B41J 2/17523 |
| 2019/0030910 A1 | 1/2019 | Tanabe et al. | ....... | B41J 2/17566 |

FOREIGN PATENT DOCUMENTS

JP 2019-025818 2/2019

* cited by examiner

*Primary Examiner* — Jason S Uhlenhake
*Assistant Examiner* — Alexander D Shenderov
(74) *Attorney, Agent, or Firm* — Venable LLP

(57) ABSTRACT

A liquid supply device attachable to and detachable from an image forming apparatus includes: a storage portion configured to store liquid; a supply portion configured to supply the liquid stored in the storage portion to the image forming apparatus; an atmosphere communication port opening to an outside of the liquid supply device; and a flow passage member including a connection flow passage formed therein. The liquid supply device is switchable, by movement of the flow passage member, between an open state in which the connection flow passage connects the storage portion to the atmosphere communication port, and a sealed state in which the connection flow passage does not connect the storage portion to the atmosphere communication port.

9 Claims, 7 Drawing Sheets

LIQUID SUPPLY DEVICE

BACKGROUND OF THE INVENTION

Field of the Invention

The present invention relates to a liquid supply device that supplies liquid to an image forming apparatus.

Description of the Related Art

As an example of a liquid supply device, an ink cartridge is known that can be attached to and detached from an image forming apparatus, such as an inkjet recording apparatus, to store therein ink to be supplied to the image forming apparatus. In such an ink cartridge, to supply the internal ink to the image forming apparatus, a communication port communicating with the atmosphere is formed in addition to an ink supply port. Japanese Patent Application Publication No. 2019-25818 discloses a configuration in which a semi-permeable membrane that blocks a flow of fluid and permits a flow of atmosphere is provided at an atmosphere communication port.

SUMMARY OF THE INVENTION

However, in the above configuration, the interior of the liquid supply device is shut off from the outside only by the semipermeable membrane, so that the liquid supply device has a low liquid leakage prevention property. As such, when the liquid supply device is detached from the image forming apparatus, the atmosphere communication port is open. This may cause the liquid remaining inside to leak if the liquid supply device is handled without paying attention to its orientation.

It is an object of the present invention to improve the liquid leakage prevention property of a liquid supply device that is attachable to and detachable from an image forming apparatus and supplies liquid therein to the image forming apparatus.

To achieve the above object, the liquid supply device that is attachable to and detachable from an image forming apparatus of the present invention includes:

According to the present invention, it is possible to improve the liquid leakage prevention property of a liquid supply device that is attachable to and detachable from an image forming apparatus and supplies liquid therein to the image forming apparatus.

Further features of the present invention will become apparent from the following description of exemplary embodiments with reference to the attached drawings.

DESCRIPTION OF THE EMBODIMENTS

Hereinafter, a description will be given, with reference to the drawings, of embodiments (examples) of the present invention. However, the sizes, materials, shapes, their relative arrangements, or the like of constituents described in the embodiments may be appropriately changed according to the configurations, various conditions, or the like of apparatuses to which the invention is applied. Therefore, the sizes, materials, shapes, their relative arrangements, or the like of the constituents described in the embodiments do not intend to limit the scope of the invention to the following embodiments.

First Embodiment

Figure 1:
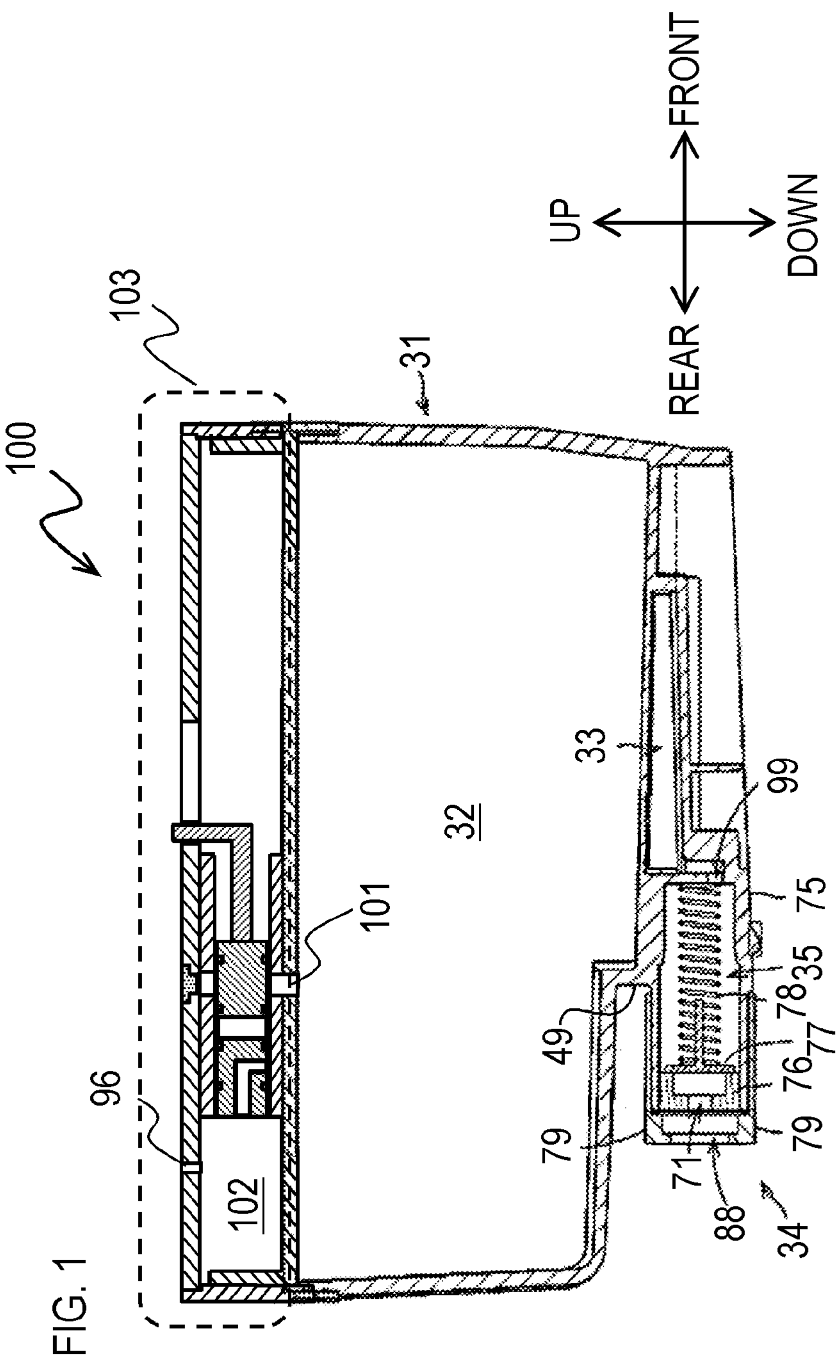
FIG. 1 is a schematic cross-sectional view of an ink cartridge according to a first embodiment.

Referring to FIG. 1, an ink cartridge 100 according to a first embodiment is now described. FIG. 1 is a schematic cross-sectional view of the ink cartridge 100. The ink cartridge 100 stores ink therein and is configured to be attachable to and detachable from an image forming apparatus such as an inkjet printer. In the following description, the vertical direction in a state in which the ink cartridge 100 is orientated to be attached to the image forming apparatus is referred to as an up-down direction, and the direction in which the ink cartridge 100 is detached from the image forming apparatus is referred to as a front-rear direction. In this embodiment, the rear direction is the direction in which the ink cartridge 100 is attached to the image forming apparatus, and the front direction is the direction in which the ink cartridge 100 is detached from the image forming apparatus.

The ink cartridge 100 has a main body 31 in which an ink chamber 32, a reserve chamber 33, an ink valve chamber 35, and an atmosphere communication portion 103 are formed. The ink chamber 32, the reserve chamber 33, and the ink valve chamber 35 each store ink therein. In the ink cartridge 100 of this embodiment, the reserve chamber 33 and the ink valve chamber 35 are arranged adjacent to each other, and the ink chamber 32 is arranged above them. The ink chamber 32 communicates with the reserve chamber 33 through a through hole (not shown), and the reserve chamber 33 communicates with the ink valve chamber 35 through a through hole 99 formed at the lower end of the reserve chamber 33.

The ink chamber 32 is a storage portion that stores ink therein, and the atmosphere communication portion 103 is provided above the ink chamber 32. An atmosphere communication flow passage 101, which serves as a communication flow passage, is formed between the ink chamber 32 and the atmosphere communication portion 103. The ink chamber 32, the reserve chamber 33, and the ink valve chamber 35 communicate with the atmosphere through the atmosphere communication flow passage 101 and an atmosphere communication chamber 102 in the atmosphere communication portion 103. The atmosphere communication portion 103 includes the atmosphere communication chamber 102 and a flow passage switching mechanism, which can open and close the passage between the atmosphere communication flow passage 101 and the atmosphere communication chamber 102. The atmosphere communication chamber 102 has an atmosphere communication port 96, which opens to the outside of the main body 31 (the outside of the liquid supply device), and the atmosphere communication chamber 102 communicates with the outside of the main body 31. That is, the ink chamber 32, the reserve chamber 33, and the ink valve chamber 35 communicate with the outside of the main body 31 through the atmosphere communication flow passage 101, the atmosphere communication chamber 102, and the atmosphere communication port 96. A semipermeable membrane that blocks a flow of fluid and permits a flow of atmosphere may be provided adjacent to the atmosphere communication port 96.

The rear side of the ink cartridge 100 of this embodiment has a stepped shape, and the upper side protrudes rearward of the lower side. Also, the lower rear side of the ink cartridge 100 includes a stepped surface 49, which is recessed frontward. A cylindrical supply portion 34 projects rearward from the stepped surface 49. The supply portion 34 is a portion that is to be connected to the image forming apparatus to supply the ink in the ink cartridge 100 to the image forming apparatus. The ink valve chamber 35 is formed in the supply portion 34 to prevent ink leakage. As described above, the front end of the ink valve chamber 35 communicates with the lower end of the reserve chamber 33 through the through hole 99.

The supply portion 34 includes a cylindrical portion 75, a sealing member 76, a valve 77, a coil spring 78, and a cover member 79. The sealing member 76 is provided at the rear end portion of the supply portion 34, and the sealing member 76 has an ink supply port 71, which extends through the sealing member 76 in the front-rear direction and opens to the outside of the ink cartridge 100. Additionally, the cover member 79, which covers the outer circumference surface of the cylindrical portion 75, has an opening 88. That is, the ink valve chamber 35 communicates with the outside of the ink cartridge 100 through the ink supply port 71 and the opening 88.

The sealing member 76 is a disk-shaped member having the ink supply port 71, which is a hole extending through the sealing member 76 in the front-rear direction at the center. The sealing member 76 is made of an elastic material such as rubber or elastomer.

The valve 77 and the coil spring 78 are accommodated in the ink valve chamber 35. The valve 77 is a member that closes the ink supply port 71 of the sealing member 76 and moves in the front-rear directions to open and close the ink supply port 71. The coil spring 78 is a member that urges the valve 77 rearward. Thus, in a state in which no external force is applied, the valve 77 urged by the coil spring 78 closes the ink supply port 71 of the sealing member 76 to prevent ink leakage. In contrast, when an introduction tube such as a needle of the image forming apparatus is inserted into the supply portion 34 urging the sealing member 76 frontward, the ink in the ink cartridge 100 can be supplied to the image forming apparatus.

Figure 2A:
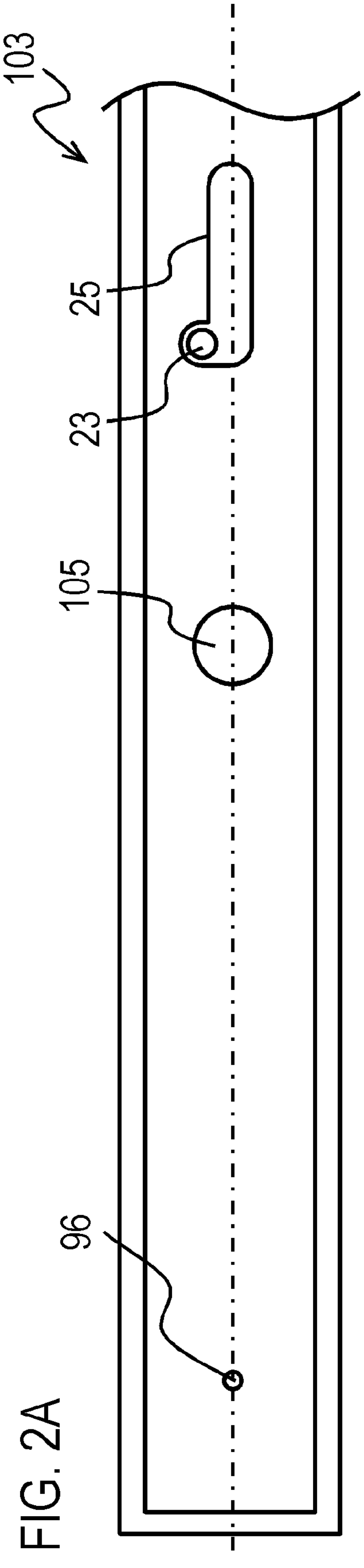
FIGS. 2A and 2B are diagrams showing an atmosphere communication portion of the ink cartridge according to the first embodiment.
Figure 2B:
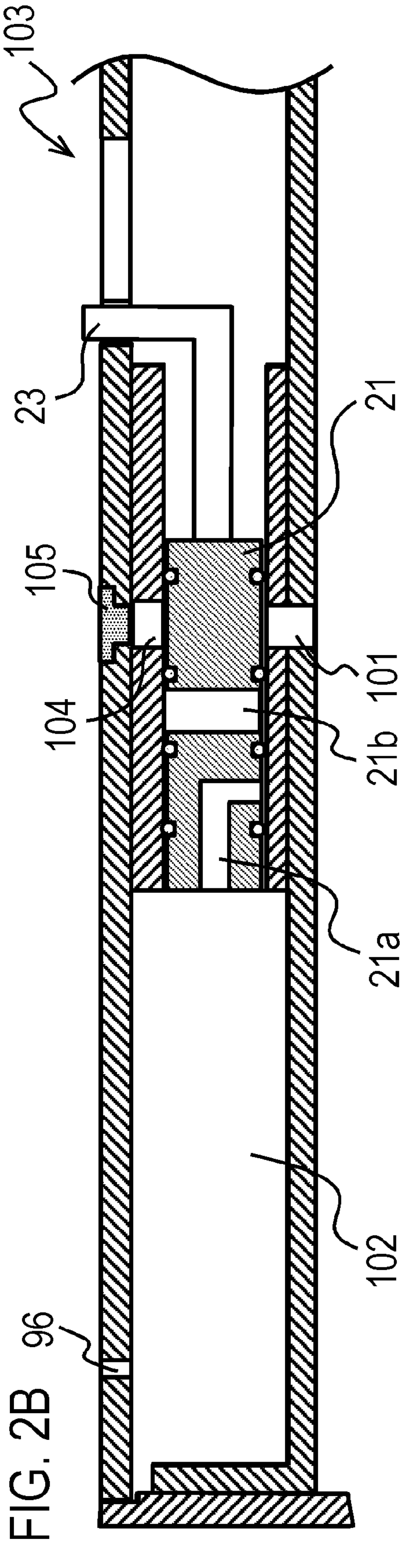

Referring to FIGS. 2A and 2B, the configuration of the atmosphere communication portion 103 according to the present embodiment is now described in detail. FIG. 2A is a top view of the atmosphere communication portion 103, and FIG. 2B is a schematic cross-sectional view of the atmosphere communication portion 103. The atmosphere communication portion 103 includes a flow passage member 21, which is adjacent to the atmosphere communication chamber 102 and linearly movable in the front-rear directions, and a lever 23 connected to the flow passage member 21. The lever 23 is an operation portion for moving the flow passage member 21, and extends frontward from the front end surface of the flow passage member 21 and is bent upward. The distal end portion of the lever 23 on the upper side is inserted in a lever guide portion 25 formed in the main body 31, and projects outward from the main body 31. The lever guide portion 25 is a substantially L-shaped opening extending through the main body 31 in the up-down direction. The operator can move the flow passage member 21 by operating the portion of the lever 23 that projects outward of the main body 31. Furthermore, the image forming apparatus may include an engagement portion that engages with the lever 23 and a mechanism for moving the lever 23 and the flow passage member 21 when the ink cartridge 100 is attached or detached.

The flow passage member 21 is a columnar member having a first flow passage 21*a* and a second flow passage 21*b* formed therein. The flow passage member 21 is moved so as to allow the flow passages inside the flow passage member 21 to selectively communicate with the atmosphere communication flow passage 101. The first flow passage 21*a* is a connection flow passage for connecting the atmosphere communication flow passage 101 and the atmosphere communication chamber 102, and has one end extending to the outer circumference surface of the flow passage member 21 and the other end extending to the end surface of the flow passage member 21 on the side corresponding to the atmosphere communication chamber 102. The second flow passage 21*b* is a connection flow passage for providing communication between the atmosphere communication flow passage 101 and the outside of the ink cartridge 100, and both ends of the second flow passage 21*b* extend to the outer circumference surface of the flow passage member 21.

The columnar flow passage member 21 includes a plurality of sealing members 27 at its outer circumference portion. The flow passage member 21 is movable between the first position at which the outer circumference surface of the flow passage member 21 closes the atmosphere communication flow passage 101, the second position at which the first flow passage 21*a* communicates with the atmosphere communication flow passage 101, and the third position at which the second flow passage 21*b* communicates with the atmosphere communication flow passage 101. The first position is the position at which the flow passage member 21 is closest to the atmosphere communication chamber 102, the second position is the position at which the flow passage member 21 is the farthest from the atmosphere communication chamber 102, and the third position is between the first position and the second position. The sealing members 27 are arranged so as to prevent ink leakage regardless of the position of the flow passage member 21.

An ink filling port 104, which opens to the outside of the ink cartridge 100, and a plug 105, which closes the ink filling port 104, are provided above the atmosphere communication flow passage 101. When the flow passage member 21 moves to a predetermined position, the second flow passage 21*b* provides communication between the atmosphere communication flow passage 101 and the ink filling port 104, and the ink cartridge 100 is brought into a state in which the ink chamber 32 can be refilled with ink by removing the plug 105. In other words, the atmosphere communication portion 103 includes the atmosphere communication port (first atmosphere communication port) 96 and the ink filling port (second atmosphere communication port) 104 as communication ports that open to the outside of the main body 31.

Figures 3A, 3B, 3C:
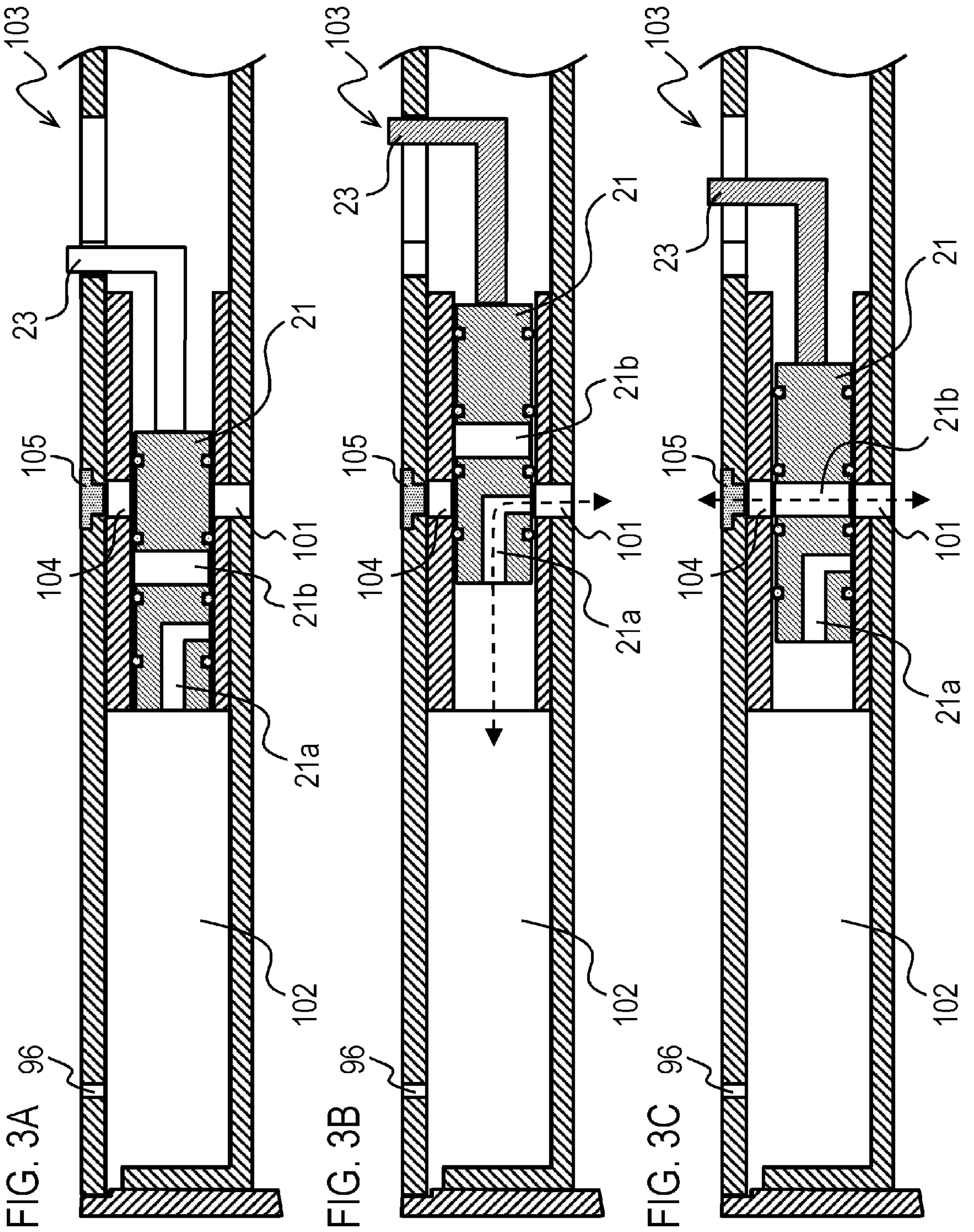
FIGS. 3A to 3C are diagrams showing the operation of a flow passage member of the atmosphere communication portion according to the first embodiment.

Referring to FIGS. 3A to 3C, the function of the atmosphere communication portion 103 is now described. FIG. 3A is a cross-sectional view showing a state in which the flow passage member 21 is at the first position and the outer circumference surface (outer wall surface) of the flow passage member 21 closes the atmosphere communication flow passage 101. That is, when the flow passage member 21 is at the first position, the ink cartridge 100 is in a sealed state in which the interior of the ink cartridge 100 is shut off from the outside atmosphere. While ink supply or filling is not performed, such as before the ink cartridge 100 is attached to the image forming apparatus, the flow passage member 21 is at the first position, closing the atmosphere communication flow passage 101 and preventing ink leakage.

FIG. 3B is a cross-sectional view showing a state in which the flow passage member 21 is at the second position and the first flow passage 21*a* communicates with the atmosphere communication flow passage 101. When the flow passage member 21 is at the second position, one end of the first flow passage 21*a* on the side corresponding to the atmosphere communication flow passage 101 and the other end on the opposite side are open to the atmosphere communication chamber 102, forming a flow passage in the directions of the arrows in FIG. 3B. That is, the ink chamber 32 communicates with the outside of the ink cartridge 100 through the atmosphere communication flow passage 101, the first flow passage 21*a*, the atmosphere communication chamber 102, and the atmosphere communication port 96. Also, when the flow passage member 21 is at the second position, the ink cartridge 100 is in an open state in which the interior is open to the outside atmosphere. When the ink cartridge 100 is attached to the image forming apparatus with the interior of the ink cartridge 100 communicating with the outside atmosphere, the ink can be supplied from the ink cartridge 100 to the image forming apparatus.

FIG. 3C is a cross-sectional view showing a state in which the flow passage member 21 is at the third position and the second flow passage 21*b* communicates with the atmosphere communication flow passage 101. When one end of the second flow passage 21*b* opens to the atmosphere communication flow passage 101, the other end of the second flow passage 21*b* opens to the ink filling port 104, forming a flow passage in the directions of the arrows in FIG. 3C. That is, when the flow passage member 21 is at the third position, the ink chamber 32 communicates with the outside of the ink cartridge 100 through the atmosphere communication flow passage 101, the second flow passage 21*b*, and the ink filling port 104. When the flow passage member 21 is at the third position, the ink cartridge 100 is in an open state in which the interior is open to the outside atmosphere. With such a configuration, when the ink cartridge 100 is refilled with ink, the ink is introduced without passing through the atmosphere communication chamber 102 or the first flow passage 21*a*, which are air flow passages. As a result, the atmosphere communication chamber 102 and the like are not contaminated by ink refilling. After the ink refilling, the flow passage member 21 is moved to the first position to prevent ink leakage.

To effectively use the present invention, the image forming apparatus preferably includes a mechanism and an engagement portion that integrally move the lever 23 and the flow passage member 21 when the ink cartridge 100 is attached or detached. When the ink cartridge 100 is attached to the image forming apparatus, the mechanism moves the lever 23, thereby moving the flow passage member 21 to the second position from the first position. When the ink cartridge 100 is detached from the image forming apparatus, the engagement portion moves the lever 23, thereby moving the flow passage member 21 to the first position from the second position. This configuration brings the ink cartridge 100 into a state that prevents ink leakage while being detached from the image forming apparatus. This prevents ink leakage more reliably and also improves the work performance in replacing the liquid supply device such as an ink cartridge.

As described above, according to the present invention, the ink cartridge 100 can be configured to be switchable between an open state in which the interior is open to the atmosphere and a sealed state in which the interior is shut off from the atmosphere. As a result, the interior of the ink cartridge 100 is sealed while the ink cartridge 100 is not attached to the image forming apparatus, thereby preventing ink leakage. Also, during ink refilling, ink can be introduced into the ink chamber 32 without passing through the atmosphere communication chamber 102 or the first flow passage 21*a*, thereby preventing contamination in the atmosphere communication chamber 102 and the like. Furthermore, in addition to the atmosphere communication port 96, the ink filling port 104 with a larger hole diameter is provided. This improves the work performance in the cleaning of the interior of the ink cartridge 100 and ink refilling when the ink cartridge is reused.

Second Embodiment

Figures 4A, 4B, 4C:
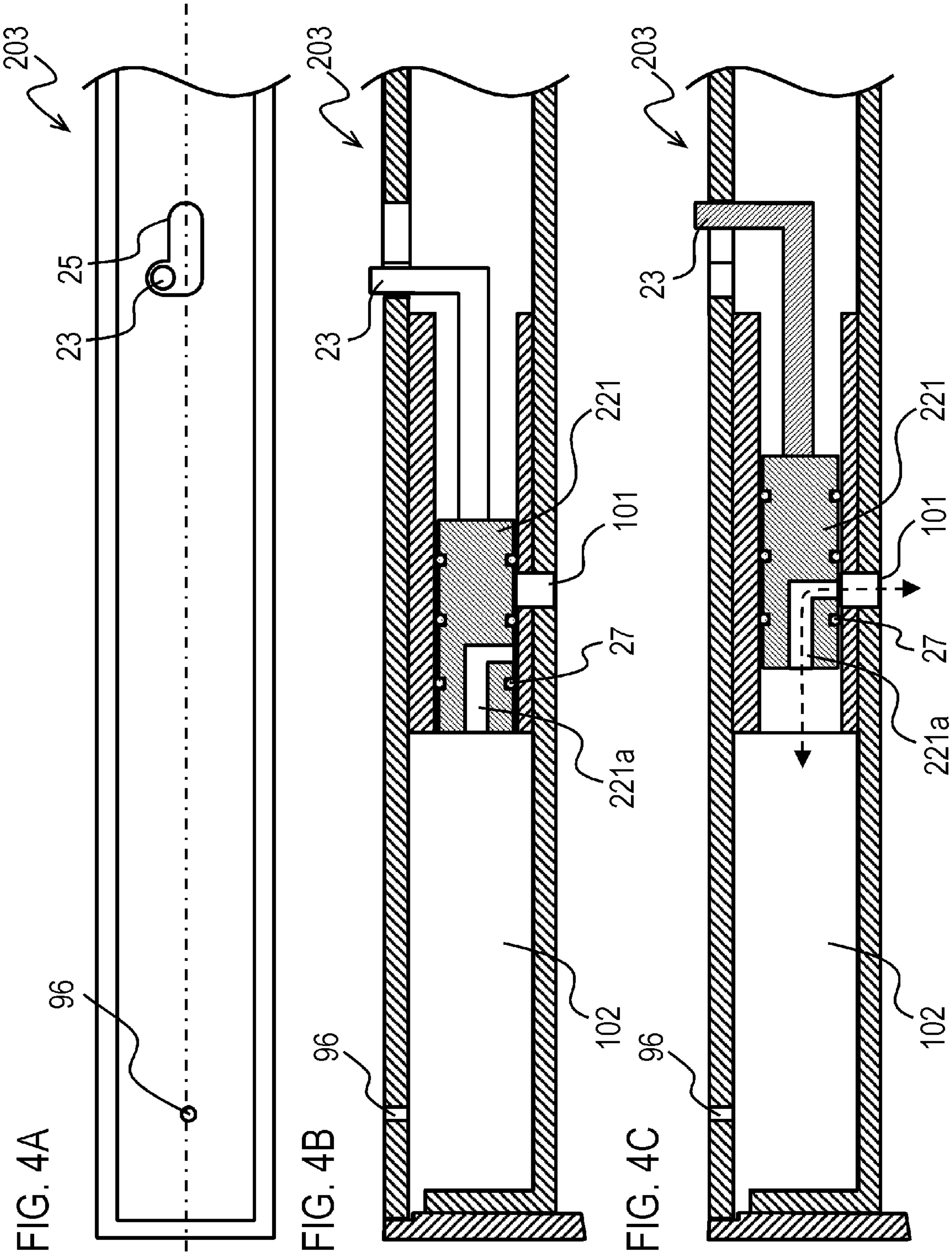
FIGS. 4A to 4C are diagrams showing an atmosphere communication portion of an ink cartridge according to a second embodiment.

Referring to FIGS. 4A to 4C, a second embodiment according to the present invention is now described. FIG. 4A is a top view of an atmosphere communication portion 203 according to the second embodiment. FIG. 4B is a schematic cross-sectional view of the atmosphere communication portion 203 showing a state in which the atmosphere communication flow passage 101 is closed. FIG. 4C is a schematic cross-sectional view of the atmosphere communication portion 203 showing a state in which the atmosphere communication flow passage 101 communicates with the atmosphere communication chamber 102.

The second embodiment differs from the first embodiment in that the flow passage member has only one flow passage. Hereinafter, the same reference numerals are given to the same configurations as the first embodiment, and the description thereof is omitted. The characteristic points of the second embodiment are described below.

A flow passage member 221 provided in the atmosphere communication portion 203 of the second embodiment has a flow passage 221*a*, which can provide communication between the atmosphere communication flow passage 101 and the atmosphere communication chamber 102. One end of the flow passage 221*a* extends to the outer circumference surface of the flow passage member 221, and the other end extends to the end surface of the flow passage member 221 on the side corresponding to the atmosphere communication chamber 102. As shown in FIG. 4B, when the flow passage member 221 is at the first position, the outer circumference surface of the flow passage member 221 closes the atmosphere communication flow passage 101, thereby preventing ink leakage.

As shown in FIG. 4C, when the flow passage member 221 is at the second position, one end of the flow passage 221*a* opens to the atmosphere communication chamber 102, and the other end opens to the atmosphere communication flow passage 101, providing communication between the atmosphere communication chamber 102 and the atmosphere communication flow passage 101. That is, the ink chamber 32 communicates with the outside of the ink cartridge 100 through the atmosphere communication flow passage 101, the flow passage 221*a*, the atmosphere communication chamber 102, and the atmosphere communication port 96.

As described above, the present embodiment ensures that ink leakage from the ink cartridge 100 is prevented while the ink cartridge 100 is not attached to the image forming apparatus. Also, the atmosphere communication portion 203 does not have an ink filling port for ink refilling, and only the flow passage 221*a* is formed inside the flow passage member 221. As such, as compared to the first embodiment, the present embodiment allows the atmosphere communication portion 203 to be smaller. This allows the ink cartridge 100 to be smaller. In also the present embodiment, the image forming apparatus preferably includes a mechanism and an engagement portion that integrally move the lever 23 and the flow passage member 21 when the ink cartridge 100 is attached or detached.

Third Embodiment

Figures 5A, 5B, 5C:
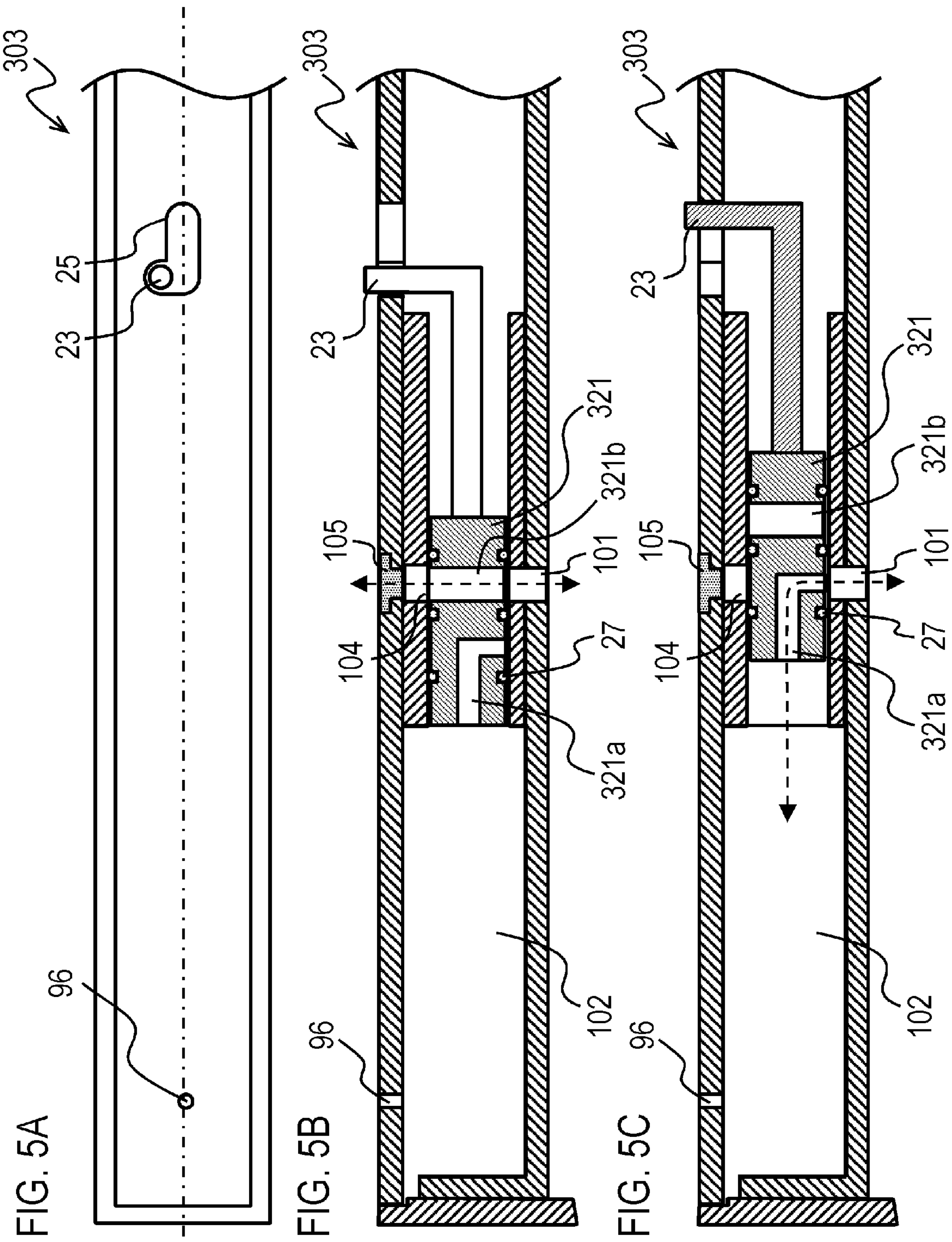
FIGS. 5A to 5C are diagrams showing an atmosphere communication portion of an ink cartridge according to a third embodiment.

Referring to FIGS. 5A to 5C, a third embodiment according to the present invention is now described. FIG. 5A is a top view of an atmosphere communication portion 303 according to the third embodiment. FIG. 5B is a schematic cross-sectional view of the atmosphere communication portion 303 showing a state in which the atmosphere communication flow passage 101 communicates with the ink filling port 104. FIG. 5C is a schematic cross-sectional view of the atmosphere communication portion 303 showing a state in which the atmosphere communication flow passage 101 communicates with the atmosphere communication chamber 102.

The third embodiment differs from the first embodiment in that the second flow passage in the flow passage member communicates with the atmosphere communication flow passage when the flow passage member is positioned at the first position. Hereinafter, the same reference numerals are given to the same configurations as the first and second embodiments, and the description thereof is omitted. The characteristic points of the third embodiment are described below.

A flow passage member 321 provided in the atmosphere communication portion 303 of the third embodiment includes a first flow passage 321*a*, which can provide communication between the atmosphere communication flow passage 101 and the atmosphere communication chamber 102, and a second flow passage 321*b*, which can provide communication between the atmosphere communication flow passage 101 and the ink filling port 104. When the flow passage member 321 is at the first position shown in FIG. 5B, the second flow passage 321*b* opens to the atmosphere communication flow passage 101, and the atmosphere communication flow passage 101 communicates with the ink filling port 104 through the second flow passage 321*b*. To prevent ink leakage, the plug 105 closes the ink filling port 104. To refill the ink cartridge 100 with ink, the plug 105 is removed to allow ink to be introduced through the ink filling port 104.

As shown in FIG. 5C, when the flow passage member 321 is at the second position, one end of the first flow passage 321*a* opens to the atmosphere communication chamber 102, and the other end opens to the atmosphere communication flow passage 101, providing communication between the atmosphere communication chamber 102 and the atmosphere communication flow passage 101. The ink chamber 32 communicates with the outside of the ink cartridge 100 through the atmosphere communication flow passage 101, the first flow passage 321*a*, the atmosphere communication chamber 102, and the atmosphere communication port 96, so that the ink can be supplied to the image forming apparatus from the ink cartridge 100.

This configuration ensures that ink leakage from the ink cartridge 100 is prevented while the ink cartridge 100 is not attached to the image forming apparatus. Also, as compared to the first embodiment, the present embodiment allows the atmosphere communication portion 303 to be smaller. This allows the ink cartridge 100 to be smaller. In also the present embodiment, the image forming apparatus preferably includes a mechanism and an engagement portion that integrally move the lever 23 and the flow passage member 321 when the ink cartridge 100 is attached or detached.

Fourth Embodiment

Figures 6A, 6B, 6C:
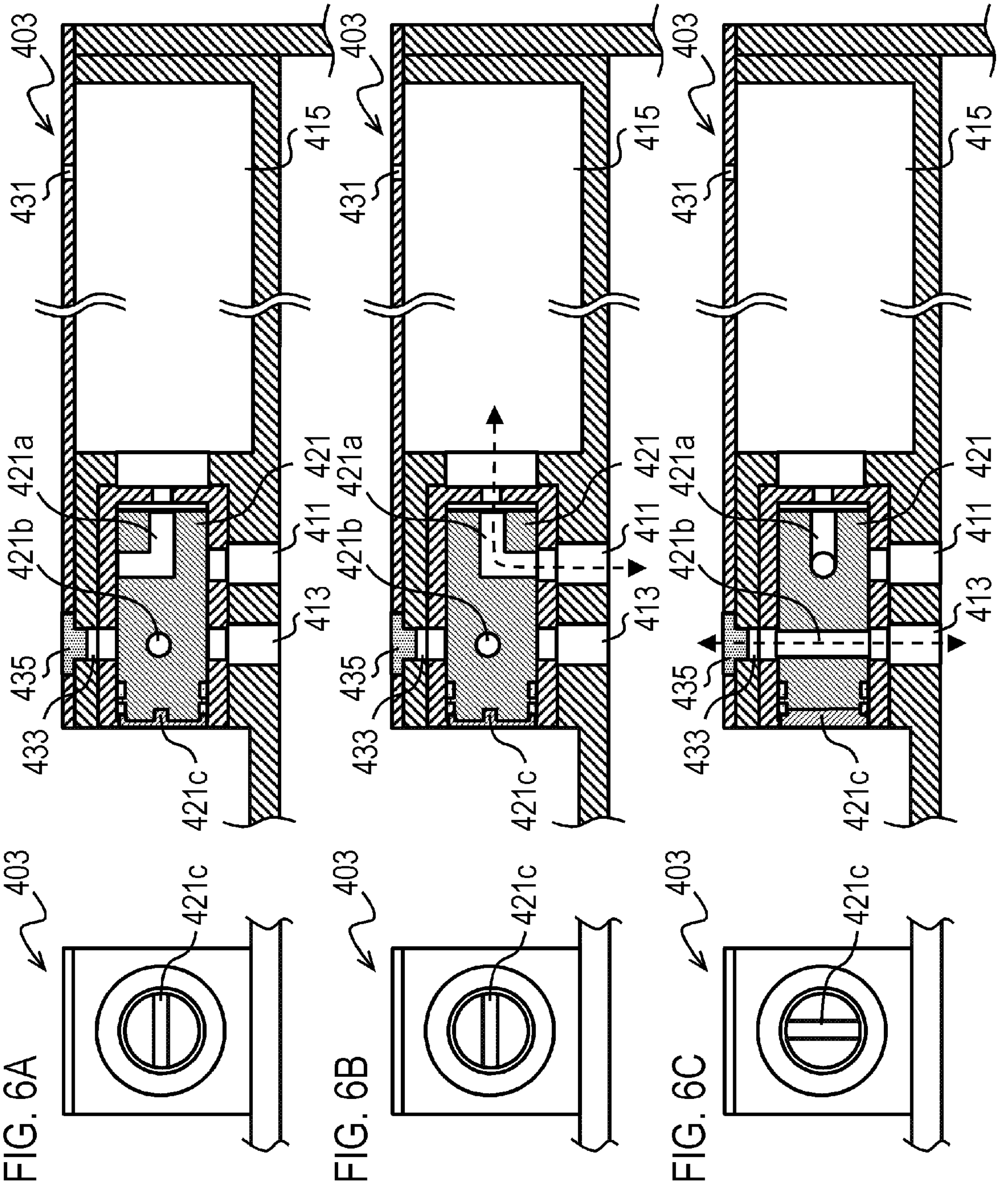
FIGS. 6A to 6C are diagrams showing an atmosphere communication portion of an ink cartridge according to a fourth embodiment.

Referring to FIGS. 6A to 6C, a fourth embodiment according to the present invention is now described. FIG. 6A is a schematic cross-sectional view of an atmosphere communication portion 403 showing a state in which an atmosphere communication flow passage 411 and a filling port communication flow passage 413 are closed. FIG. 6B is a schematic cross-sectional view of the atmosphere communication portion 403 showing a state in which the atmosphere communication flow passage 411 communicates with an atmosphere communication chamber 415. FIG. 6C is a schematic cross-sectional view of the atmosphere communication portion 403 showing a state in which the filling port communication flow passage 413 communicates with an ink filling port 433.

The fourth embodiment differs from the first embodiment in that the flow passage member is configured to be rotationally movable. Hereinafter, the same reference numerals are given to the same configurations as the first embodiment, and the description thereof is omitted. The characteristic points of the fourth embodiment are described below.

The atmosphere communication portion 403 of this embodiment includes the atmosphere communication flow passage 411 and the filling port communication flow passage 413, which are open to the ink chamber 32, and an atmosphere communication port 431 and the ink filling port 433, which are open to the outside of the ink cartridge 100. The atmosphere communication portion 403 also includes the atmosphere communication chamber 415, which opens at the atmosphere communication port 431, and the flow passage member 421, which is adjacent to the atmosphere communication chamber 415. A plug 435 closes the ink filling port 433 when ink refilling is not performed. That is, the flow passage member 421, which is a rotating member, is configured like a three-way valve. The rotating member is rotated to bring the flow passages formed in the rotating member into communication with the communication port opening to the ink chamber 32, so that the ink chamber 32 is directly connected to the atmosphere communication chamber 415 or to the outside of the ink cartridge 100.

The flow passage member 421 includes a first flow passage 421*a* and a second flow passage 421*b*. The flow passage member 421 rotates about a horizontal rotation axis to change its orientation, selectively bringing the ink chamber 32 into communication with the flow passages. The end surface of the flow passage member 421 that is opposite to the end surface facing the atmosphere communication chamber 415 has a recess 421*c*, which is recessed inward. The recess 421*c* is exposed on the surface of the ink cartridge 100. A jig or the like is fitted into the recess 421*c* so that the flow passage member 421 can be rotated. That is, in this embodiment, the recess 421*c* functions as an operation portion for operating the flow passage member 421.

FIG. 6A shows a state of the atmosphere communication portion 403 in which the flow passage member 421 is in the first orientation and the outer circumference surface of the flow passage member 421 closes the atmosphere communication flow passage 411 and the filling port communication flow passage 413. While ink supply or filling is not performed, such as before the ink cartridge 100 is attached to the image forming apparatus, the flow passage member 421 is in the first orientation, closing the atmosphere communication flow passage 411 and the filling port communication flow passage 413 and preventing ink leakage.

FIG. 6B shows a state of the atmosphere communication portion 403 in which the flow passage member 421 is in the second orientation and the atmosphere communication flow passage 411, which serves as the first communication flow passage, communicates with the atmosphere communication chamber 415 through the first flow passage 421*a*. Rotating the flow passage member 421 in the first orientation by 180° moves the flow passage member 421 into the second orientation. One end of the first flow passage 421*a* extends to the outer circumference surface of the flow passage member 421, and the other end extends to the end surface of the flow passage member 421 on the side corresponding to the atmosphere communication chamber 415. When the flow passage member 421 is in the second orientation, the first flow passage 421*a* opens to the atmosphere communication flow passage 411, and the atmosphere communication flow passage 411 communicates with the atmosphere communication chamber 415. At this time, the ink chamber 32 communicates with the outside of the ink cartridge 100 through the atmosphere communication flow passage 411, the first flow passage 421*a*, and the atmosphere communication chamber 415, so that the ink can be supplied to the image forming apparatus from the ink cartridge 100.

FIG. 6C shows a state of the atmosphere communication portion 403 in which the flow passage member 421 is in the third orientation and the filling port communication flow passage 413, which serves as the second communication flow passage, communicates with the ink filling port 433 through the second flow passage 421*b*. Rotating the flow passage member 421 in the first or second orientation by 90° moves the flow passage member 421 into the third orientation. Both ends of the second flow passage 421*b* extend to the outer circumference surface of the flow passage member 421. When the flow passage member 421 is in the third orientation, the second flow passage 421*b* opens to the filling port communication flow passage 413 and the ink filling port 433, and the filling port communication flow passage 413 communicates with the ink filling port 433. At this time, the ink chamber 32 can be refilled with ink through the ink filling port 433, the second flow passage 421*b*, and the filling port communication flow passage 413.

This configuration ensures that ink leakage from the ink cartridge 100 is prevented while the ink cartridge 100 is not attached to the image forming apparatus. Also, during ink refilling, ink can be introduced into the ink chamber 32 without passing through the atmosphere communication chamber 415 or the first flow passage 421*a*, thereby preventing contamination in the atmosphere communication chamber 415 and the like. Furthermore, in addition to the atmosphere communication port 431, the ink filling port 433 with a larger hole diameter is provided. This improves the work performance in the cleaning of the interior of the ink cartridge 100 and ink refilling when the ink cartridge is reused.

That is, the present invention can be applied not only to a configuration in which the flow passage member linearly moves, but also to a configuration in which the flow passage member rotationally moves. Also, the flow passage member 421 of the present embodiment does not move linearly. Thus, as compared to the second and third embodiments, the present embodiment allows the atmosphere communication portion 403 to be smaller. This allows the ink cartridge 100 to be smaller. In also the present embodiment, the image forming apparatus preferably includes a mechanism that rotates the flow passage member 421 when the ink cartridge 100 is attached or detached. Additionally, to improve the ink sealing performance, a sealing member such as an O-ring may be provided on the outer circumference surface of the flow passage member 421, provided that the rotational movement is not hindered.

Fifth Embodiment

Figure 7A:
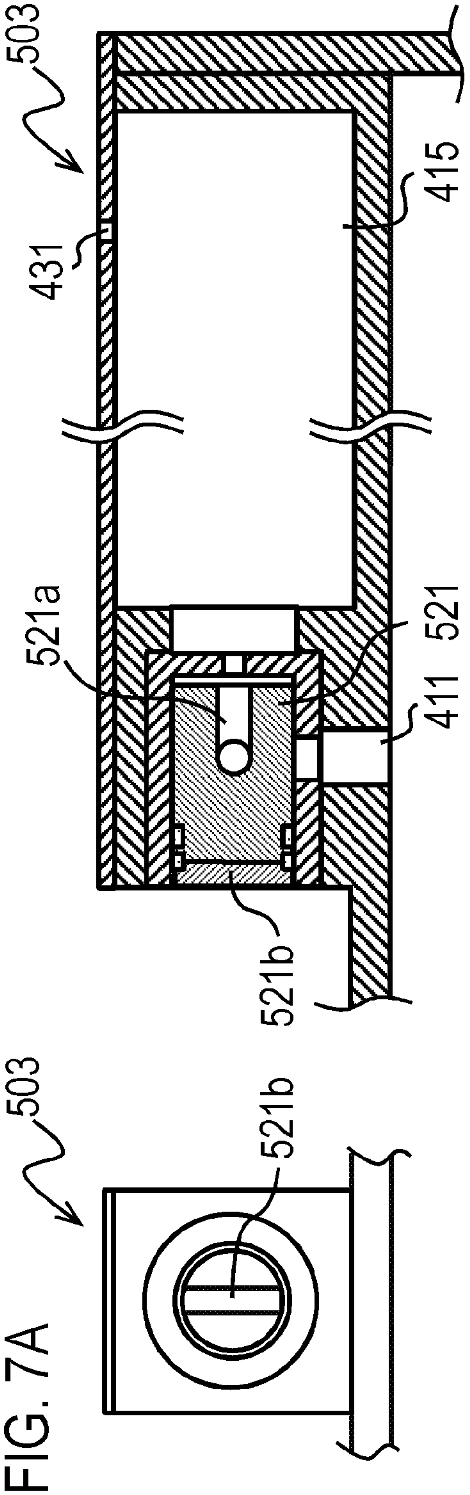
FIGS. 7A and 7B are diagrams showing an atmosphere communication portion of an ink cartridge according to a fifth embodiment.
Figure 7B:
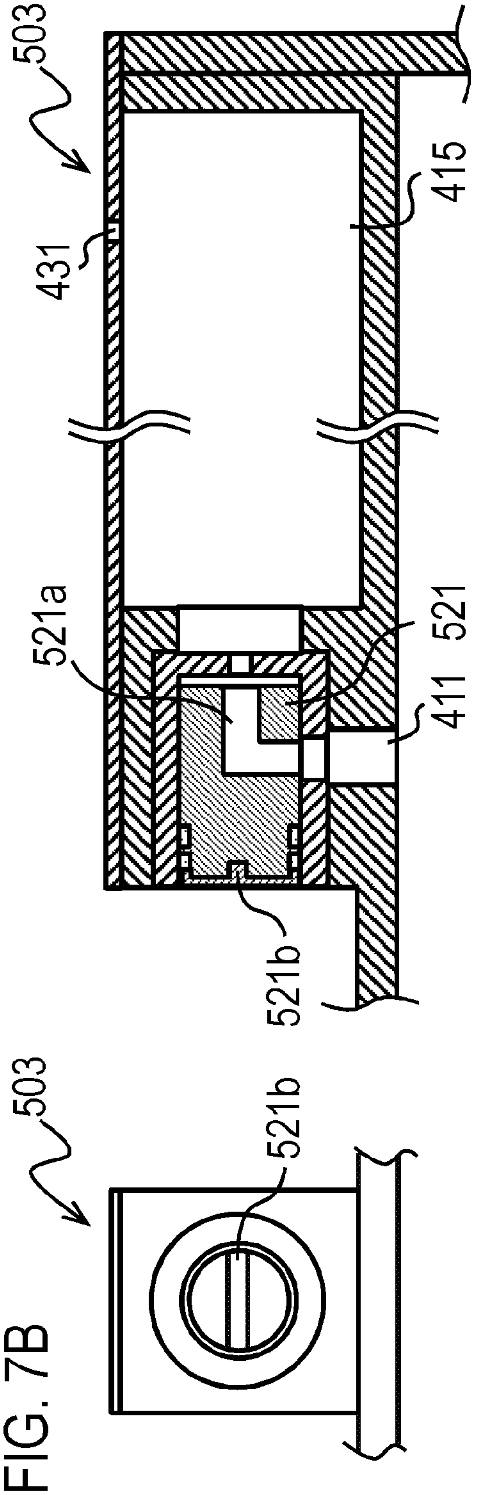

Referring to FIGS. 7A and 7B, a fifth embodiment according to the present invention is now described. FIG. 7A is a top view of an atmosphere communication portion 503 according to the fifth embodiment. FIG. 7A is a schematic cross-sectional view of the atmosphere communication portion 503 showing a state in which an atmosphere communication flow passage 411 is closed.

The fifth embodiment differs from the fourth embodiment in that the flow passage member has only one flow passage. Hereinafter, the same reference numerals are given to the same configurations as the fourth embodiment, and the description thereof is omitted. The characteristic points of the fifth embodiment are described below.

A flow passage member 521 provided in the atmosphere communication portion 503 of the fifth embodiment has a flow passage 521*a*, which can provide communication between the atmosphere communication flow passage 411 and the atmosphere communication chamber 415. The flow passage 521*a* extends from the outer circumference surface of the flow passage member 521 to the end surface on the side corresponding to the atmosphere communication chamber 415. As shown in FIG. 7A, when the flow passage member 521 is in the first orientation, the outer circumference surface of the flow passage member 521 closes the atmosphere communication flow passage 411, thereby preventing ink leakage.

As shown in FIG. 7B, when the flow passage member 521 is in the second orientation, one end of the flow passage 521*a* opens to the atmosphere communication chamber 415, and the other end opens to the atmosphere communication flow passage 411, providing communication between the atmosphere communication chamber 415 and the atmosphere communication flow passage 411. That is, the ink chamber 32 communicates with the outside of the ink cartridge 100 through the atmosphere communication flow passage 411, the flow passage 521*a*, the atmosphere communication chamber 415, and the atmosphere communication port 431. The flow passage member 521 is configured to be rotatable by fitting a jig or the like into a recess 521*b* provided in the end surface opposite to the end surface at which the flow passage 521*a* opens.

As described above, the present embodiment ensures that ink leakage from the ink cartridge 100 is prevented while the ink cartridge 100 is not attached to the image forming apparatus. Also, the atmosphere communication portion 503 does not have an ink filling port for ink refilling, and only the flow passage 521*a* is formed inside the flow passage member 521. As such, as compared to the fourth embodiment, the present embodiment allows the atmosphere communication portion 503 to be smaller. This allows the ink cartridge 100 to be smaller. In also the present embodiment, the image forming apparatus preferably includes a mechanism that rotates the flow passage member 521 when the ink cartridge 100 is attached or detached.

The configuration of the present invention is not limited to the configurations described above, and various modifications are possible without losing the sameness as the invention embodied in the above-described embodiments. For example, the liquid supply device may include a mechanism in which a lever is attached to a rotatable flow passage member as an operation portion to rotate the flow passage member.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-128228, filed on Aug. 10, 2022, which is hereby incorporated by reference herein in its entirety.

What is claimed is:

1. A liquid supply device attachable to and detachable from an image forming apparatus, the liquid supply device comprising:

a storage portion configured to store liquid;

a supply portion configured to supply the liquid stored in the storage portion to the image forming apparatus;

a first atmosphere communication port opening to an outside of the liquid supply device;

a flow passage member including a first flow passage formed therein; and a second atmosphere communication port opening to the outside of the liquid supply device, wherein the liquid supply device is switchable, by movement of the flow passage member, between an open state in which the first flow passage of the flow passage member connects the storage portion to the first atmosphere communication port, and a sealed state in which the first flow passage does not connect the storage portion to the first atmosphere communication port, and wherein a second flow passage for connecting the second atmosphere communication port to the storage portion is formed inside the flow passage member.

2. The liquid supply device according to claim 1, wherein a communication flow passage is formed between the storage portion and the flow passage member, and wherein the flow passage member is configured to be linearly movable between a first position at which an outer wall surface of the flow passage member closes the communication flow passage, and a second position at which one end of the first flow passage opens to the communication flow passage.

3. The liquid supply device according to claim 1, wherein a communication flow passage is formed between the storage portion and the flow passage member, and wherein the flow passage member is configured to be rotationally movable between a first orientation in which an outer wall surface of the flow passage member closes the communication flow passage, and a second orientation in which one end of the first flow passage opens to the communication flow passage.

4. The liquid supply device according to claim 1, wherein a communication flow passage is formed between the storage portion and the flow passage member, and wherein the flow passage member is configured to be linearly movable between a first position at which an outer circumference surface of the flow passage member closes the communication flow passage, a second position at which one end of the first flow passage opens to the communication flow passage, and a third position at which one end of the second flow passage opens to the communication flow passage.

5. The liquid supply device according to claim 1, wherein a first communication flow passage and a second communication flow passage are formed between the storage portion and the flow passage member, and wherein the flow passage member is configured to be rotationally movable between a first orientation in which an outer circumference surface of the flow passage member closes the first communication flow passage and the second communication flow passage, a second orientation in which one end of the first flow passage opens to the first communication flow passage, and a third orientation in which one end of the second flow passage opens to the second communication flow passage.

6. The liquid supply device according to claim 1, wherein the flow passage member includes an operation portion for moving the flow passage member, the operation portion being at least partially exposed to the outside of the liquid supply device.

7. The liquid supply device according to claim 6, wherein the operation portion is a lever that partially projects to the outside of the liquid supply device, is connected to the flow passage member, and moves integrally with the flow passage member.

8. The liquid supply device according to claim 6, wherein the operation portion is a recess that is recessed inward.

9. The liquid supply device according to claim 1, wherein the flow passage member is a columnar member including a sealing member at an outer circumference surface thereof.

* * * * *